UNITED STATES PATENT OFFICE.

EDWARD JOHNSON, OF BLACKHEATH, AND JAMES ROBEY, OF GREENWICH, ENGLAND.

IMPROVEMENT IN THE MANUFACTURE OF A FILTERING MEDIUM FOR THE PURIFICATION OF WATER, &c.

Specification forming part of Letters Patent No. 197,637, dated November 27, 1877; application filed October 11, 1877; patented in Belgium, September 18, 1877.

*To all whom it may concern:*

Be it known that we, EDWARD JOHNSON, of Blackheath, in the county of Kent, England, sanitary engineer, and JAMES ROBEY, of Greenwich, in the said county, sugar-refiner, have invented Improvements in the Manufacture of a Filtering Medium for the Purification of Water and other Liquids, of which the following is a specification:

Our said invention has for its object the production and manufacture of a filtering medium which is intended to supersede advantageously the use of the expensive material called "animal charcoal" in the filtration of potable waters and other liquids. For this purpose we take baked clay ground to a granular form, of various sizes, according to the nature of the liquid to be filtered. It is preferred that the baked clay should be in as porous a condition as can be obtained.

For the purposes of economy of manufacture, we prefer using waste baked clay, such as the broken ware of the tobacco-pipe makers, the waste and breakage of the porous battery-cell makers, the broken ware called "bisque" or "biscuit" of the earthenware and china manufacturers, or any kind of baked clay, that which is most porous being preferred, as well as that which contains some iron.

In the absence of such waste material, any suitable clay may be baked and employed for the purposes of this invention.

Having thus obtained baked clay in a granular form, we now proceed to the next process, which we term the "carbonizing process," which consists in steeping the granular baked clay in an organic solution, such as solution of treacle, solutions of grass, leaves, logwood, bark, tan, coal-tar, or any liquid containing organic matters in solution, and, after the steeped mass has been allowed to dry, placing it in retorts, to be heated (preferably to a red heat) until all gaseous emanations cease.

It will now be found that the granular baked clay is thoroughly carbonized throughout its substance, and forms a filtering medium superior to animal charcoal for the removal of albumenoid ammonia.

Any of the usual carbonizing apparatus may be used, such as the revolving cylinders of the sugar-refiners, the D-retorts of the gas-works, and the primitive cast-iron pot-kiln of the first animal-charcoal manufacturers. The last-named will make the best and purest quality of filtering material for domestic purposes; but the revolving cylinders, however, will accomplish the carbonization much more economically, while the use of the gas-works retort would enable the maker to obtain a by-product of pyroligneous acid when sawdust is the vegetable matter used.

Instead of steeping the granular baked clay in any such solution, such solutions may be passed through beds of it after the manner of filters.

The filtering medium produced in accordance with this invention is placed in any suitable receptacle and employed for the operation of filtering, as well understood.

For the purpose of producing a filtering medium, earthy matters—such as clay—have heretofore been carbonized by being mixed with dry vegetable matter, such as sawdust, straw, &c., and the mixture subjected to a sufficient degree of heat, without access of air, to carbonize said vegetable matters; but the process requires a long process of burning, and the product requires careful cleaning in order to separate from it certain light ashes and imperfectly-charred woody matter, which are not incident to our process.

We claim as our invention—

The manufacture of a filtering medium by steeping granular baked clay in a solution of organic matter, or passing such solution through beds of such clay, which is then dried, and afterward charred without access of air.

EDWARD JOHNSON.
JAMES ROBEY.

Witnesses:
HENRY DINN,
 28 *Knight Rider Street, London.*
WILMER M. HARRIS,
 17 *Gracechurch Street, London, E. C.*